3,509,221
PRODUCTION OF CYCLOOCTANEMETHANOL

Jurgen F. Falbe, Bonn, Germany, and Nicolaas Huppes, Amsterdam, Netherlands, assignors to Shell Oil Company, New York, N.Y., a corporation of Delaware
No Drawing. Filed June 27, 1966, Ser. No. 560,897
Claims priority, application Germany, July 9, 1965,
S 98,108
Int. Cl. C07c 35/20
U.S. Cl. 260—617      4 Claims

ABSTRACT OF THE DISCLOSURE

Process of initially reacting 1,5-cyclooctadiene with carbon monoxide and hydrogen in the presence of a rhodium-containing catalyst to produce cyclooctanecarboxaldehyde and then raising the temperature and maintaining a pressure of at least 100 kg./cm.$^2$ to produce cyclooctanemethanol in high yield, thereby hydroformylating and hydrogenating in one operation without a change of catalyst or gas.

---

This invention relates to an improved method for producing cyclooctanemethanol.

Methods for the production of cyclooctanemethanol are known in the art. For example, in Netherlands patent application 298,834, published May 11, 1964, is described a process for hydroformylating 1,5-cyclooctadiene in the presence of a cobalt catalyst, such as cobalt acetate or cobalt naphthenate, followed by hydrogenation, to produce cyclooctanemethanol in moderate yield. In U.S. Patent 3,239,566, Mar. 8, 1966, to L. H. Slaugh and R. D. Mullineaux, is described a process for hydroformylating olefins including 1,5-cyclooctadiene in the presence of rhodium or ruthenium carbonyl complexed with trialkylphosphine ligand to produce a product, the major portion of which are aldehydes. In order to convert the aldehydes to alcohols, subsequent heterogeneous catalytic hydrogenation over known hydrogenation catalysts is utilized as a separate operation necessitating the removal of the rhodium catalyst prior to the hydrogenation. Furthermore, since heterogeneous hydrogenation catalysts are easily poisoned in many instances, for example by carbon monoxide (see E. B. Maxted in Advances in Catalysis, vol. III, p. 156), comparatively pure hydrogen must be used in the hydrogenation operation.

It is an object of the present invention to provide an improved method for the combined hydroformylation and hydrogenation of 1,5-cyclooctadiene to produce, in one operation, cyclooctanemethanol in high yield without the necessity of changing catalysts and gases.

It has now been found that this object is accomplished by the process of initially reacting 1,5-cyclooctadiene with carbon monoxide and hydrogen in the presence of a rhodium-containing catalyst to produce cyclooctanecarboxaldehyde and then raising the temperature and maintaining certain pressure conditions to produce cyclooctanemethanol in high yield, thereby hydroformylating and hydrogenating in one operation without a change of catalyst or gas.

To effect the consecutive hydroformylation and hydrogenation, the 1,5-cyclooctadiene is contacted with carbon monoxide and hydrogen. No special precautions are required with regard to these materials and commercially available grades are satisfactory. The molar ratio of carbon monoxide to hydrogen is not critical and molar ratios from about 4:1 to about 1:4 are satisfactorily employed. Generally preferred, however, are molar ratios from about 2:1 to about 1:2. The hydrogen and carbon monoxide are suitably charged to the reaction system as such although it is also useful to employ commercial mixtures of these gaseous reactants, e.g. synthesis gas.

The catalyst is a rhodium carbonyl catalyst employed in the substantial absence of complexing ligands other than carbonyl. The rhodium carbonyl is suitably introduced as a preformed material or is formed in situ by reaction of some other form of rhodium with the other reaction mixture components. Thus, the rhodium is provided as the metal, or as the salt of an organic or inorganic acid, e.g. rhodium chloride, rhodium nitrate, rhodium naphthenate or rhodium octanoate. In yet another and frequently preferred modification, the rhodium is introduced in the form of the oxide, $Rh_2O_3$. Although the precise catalytically active species is not known with certainty, it is considered that regardless of the form in which the rhodium is provided, reaction with the carbon monoxide and/or the hydrogen present in the reaction system results in the formation of rhodium carbonyl catalyst.

The rhodium is employed in catalytic quantities, preferably in amounts from about 0.0001 gram-atom to about 0.01 gram-atom per mole of 1,5-cyclooctadiene and particularly in amounts from about 0.0004 gram-atom to about 0.004 gram-atom per mole of 1,5-cyclooctadiene.

The combined process of the invention is conducted in an inert solvent which behaves as an inert diluent at reaction temperature and pressure and is inert to the reactant as well as to the alcohol product. Illustrative solvents include ethers such as tetrahydrofuran; alcohols such as methanol, ethanol, and isopropanol; hydrocarbons free from aliphatic unsaturation such as benzene, toluene, cyclohexane, decahydronaphthalene, dodecane, and heptane; and the like.

The process of cyclooctanemethanol production comprises initially reacting the 1,5-cyclooctadiene with hydrogen and carbon monoxide in the presence of the rhodium catalyst to produce cyclooctanecarboxaldehyde and subsequently hydrogenating the initial hydroformylation product to produce cyclooctanemethanol by changing the temperature and pressure without changing the catalyst or gas composition. The temperature at which the initial hydroformylation is conducted is somewhat critical and temperatures from about 150° C. to about 170° C. provide superior results to temperatures which are either higher or lower, especially lower. The initial reaction is conducted at superatmospheric pressure and pressures from about 100 kg./cm.$^2$ to about 200 kg./cm.$^2$ are satisfactory; particularly suitable are pressures from about 130 kg./cm.$^2$ to about 200 kg./cm.$^2$. The reactants and catalyst are contacted in any convenient manner. In one process modification, solvent and catalyst are charged to an autoclave or similar reactor which is then pressurized with the gaseous CO and $H_2$ reactants, followed by addition of the 1,5-cyclooctadiene reactant.

At the conclusion of the hydroformylation reaction, which can be followed by gas chromatographic analysis, the hydrogenation reaction can be accomplished with no change of catalyst, gas composition, or reactor. Required is a rise in temperature and a maintenance of synthesis gas pressure of at least a minimum value. To effect hydrogenation, the reaction temperature is raised to the range of from 180° C. to about 250° C., preferably from about 200° C. to about 210° C., and the hydrogen component of the initial product mixture serves to effect the desired hydrogenation. Alteration of the pressure of hydrogen in the system may or may not be needed in order to effect the hydrogenation as long as a total pressure of carbon monoxide and hydrogen of at least 100 kg./cm.$^2$, preferably at least 150 kg./cm.$^2$, is maintained. There is no critical limitation on the maximum pressure used, and the synthesis-gas pressure may be as high as 2000 kg./cm.$^2$ or higher. For practical purposes pressure is kept lower, for example, no higher than about 300 kg./cm.$^2$.

The process of the invention, i.e. conducting the hydroformylation and hydrogenation without separation of the initial product mixture, offers a substantial advantage with regard to catalyst separation and recovery. At the conclusion of reaction the pressure is released when the product mixture is cooled, whereupon the rhodium catalyst decomposes and is deposited as a powder in substantially quantitative yield. The rhodium is easily recoverable, as by filtration, and may be recycled without further treatment. Under similar conditions, cobalt catalysts form cobalt mirrors and encrustations, and considerable difficulty is experienced in reusing such cobalt residues. The cyclooctanemethanol product is separated from the product mixture by conventional procedures as by fractural distillation, selective extraction, fractional crystallization, and the like.

The cyclooctanemethanol product is useful as a high-boiling solvent and heat transfer agent as well as for conversion into plastic and lacquer base materials. Cyclooctanemethanol can be oxidized to cyclooctanecarboxylic acid (see German Patents 922,648 and 1,005,061) and the acid can be converted into octahydro-2-oxo-1H-azonine (8-aminooctanoic acid lactam) (see Belgian Patent 613,730), which is a starting material for the production of nylon-8 (polyamide). Nylon-8 has improved relative wet strength compared to nylon 6.

EXAMPLE I 196 grams of cis,cis-1,5-cyclooctadiene, dissolved in 800 grams of tetrahydrofuran, was added to a 2-liter autoclave together with 0.2 gram of rhodium oxide ($Rh_2O_3$). The mixture was hydroformylated for four hours at 150–170° C. and a pressure of 150–180 kg./cm.$^2$ $CO/H_2$ (1:1). The temperature was subsequently increased to 210° C., the pressure being maintained at 180 kg./cm.$^2$. After six hours, the autoclave was cooled to room temperature and vented and the catalyst decomposition products filtered off. After the solvent had been distilled, the residue was distilled in vacuo. Yield of cyclooctanemethanol: 248 grams (97% of theory).

*Analysis.*—Calculated for $C_9H_{18}O$ (percent): C, 75.99; H, 12.76. Found (percent): C, 76.1; H, 13.0.

EXAMPLE II

In an experiment under otherwise identical conditions to thos described in Example I, but carried out at a hydroformylation temperature, time and pressure of 150° C., 4.65 hours and 200 kg./cm.$^2$ respectively and a hydrogenation temperature, time and pressure of 210° C., 6.25 hours and 300 kg./cm.$^2$ respectively, 87% of theory of cyclooctanemethanol was obtained.

For purposes of comparison, Examples III and IV following show that at first-stage temperatures below 150° C., a larger proportion of cyclooctane is converted to disubstituted product.

EXAMPLE III

When, following the method of Example I, hydroformylation was effected for six hours at 100° C. and 200 kg./cm.$^2$ $CO/H_2$ and subsequent hydrogenation for 7.85 hours at 210° C. and 300 kg./cm.$^2$, the yield of cyclooctanemethanol was only 62% of theory.

EXAMPLE IV

When, following the method of Example I, hydroformylation was effected for six hours at 110–120° C. and 200 kg./cm.$^2$ $CO/H_2$ and hydrogenation for 6.4 hours at 180° C. and 200 kg./cm.$^2$ $CO/H_2$, the yield of cyclooctanemethanol was only 67.3% of theory.

EXAMPLE V

For the purpose of comparison, this example was conducted at an initial temperature above 170° C. 1,5-cyclooctadiene was pumped into a 1-liter autoclave at 300 atmospheres and was then hydroformylated and hydrogenated, in the presence of 0.1 gram of rhodium oxide, with $CO/H_2$ (1:1) at a pressure of 1000–950 kg./cm.$^2$ and at a temperature of 200° C. for 7½ hours. The yield of cyclooctanemethanol was only 61% of theory.

We claim as our invention:

1. The process of producing cyclooctanemethanol by initially reacting (a) 1,5-cyclooctadiene, (b) carbon monoxide, and (c) from about 0.25 mole to about 4 moles of hydrogen per mole of carbon monoxide, in solution an inert solvent in the presence of from about 0.0001 gram-atom to about 0.01 gram-atom of rhodium catalyst provided as rhodium oxide per mole of the 1,5-cyclooctadiene reactant at a temperature of from about 150° C. to about 170° C. and a pressure of from about 100 kg./cm.$^2$ to about 200 kg./cm.$^2$ to produce cyclooctanecarboxaldehyde; and subsequently maintaining the resulting mixture at a temperature of from 180° C. to about 250° C. and a pressure of at least 100 kg./cm$^2$ to product cyclooctanemethanol.

2. The process of claim 1 wherein the inert solvent is tetrahydrofuran.

3. The process of claim 1 wherein the subsequent temperature range is from about 200° C. to about 210° C.

4. The process of claim 1 wherein the process is conducted in the presence of from about 0.0004 gram-atom to about 0.004 gram-atom of rhodium catalyst per mole of 1,5-cyclooctadiene reactant.

References Cited

UNITED STATES PATENTS

| | | |
|---|---|---|
| 2,614,107 | 10/1952 | Wender et al. |
| 2,850,536 | 9/1958 | Buchner et al. |
| 2,880,241 | 3/1959 | Hughes. |
| 2,894,038 | 7/1959 | Bartlett et al. |
| 3,085,114 | 4/1963 | Heimsch et al. |
| 2,327,066 | 8/1943 | Roelen _____ 260—598 |
| 3,089,904 | 5/1963 | Lippincott _____ 260—617 |

LEON ZITVER, Primary Examiner

M. W. GLYNN, Assistant Examiner

U.S. Cl. X.R.

260—598